2,996,506
PIPERAZINE DERIVATIVES
Philippe Gold-Aubert, Geneva, Switzerland, assignor to Laboratoire Sapos, Geneva, Switzerland, a Swiss body corporate
No Drawing. Filed June 16, 1958, Ser. No. 742,033
Claims priority, application Great Britain June 25, 1957
8 Claims. (Cl. 260—268)

This invention relates to new therapeutically active compounds and to processes for their production.

More particularly the invention relates to compounds of the general formula.

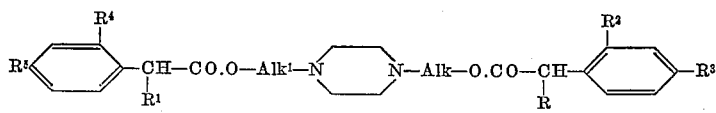

(in which R and $R^1$, which may be the same or different, are hydrogen atoms, alkyl groups containing from 1–5 carbon atoms, unsaturated aliphatic groups such as allyl or vinyl groups or aryl or aralkyl groups, —Alk— and —$Alk^1$— are alkylene chains containing from 1–3 carbon atoms which may be straight or branched and which may be the same or different and $R^2$, $R^3$, $R^4$ and $R^5$, which may be the same or different, are hydrogen atoms or alkoxy groups containing from 1–3 carbon atoms) and their non-toxic salts.

Preferred compounds according to the invention are those in which Alk and $Alk^1$ are —$CH_2CH_2$— and the compound N,N'-di-(β-phenylethyl-acetyloxyethyl) piperazine dihydrochloride has been found to be especially useful. Examples of non-toxic salts of the stated compounds are the hydrohalides, sulphates, phosphates, citrates, lactates, acetates etc. and of these the dihydrohalides are preferred.

Other compounds according to the invention which are of special interest are shown in the following table:

TABLE

| Alk.=$Alk^1$ | $R^1$=R | $R^2$=$R^4$ | $R^3$=$R^5$ | M.P. °C. |
|---|---|---|---|---|
| —CH—$CH_2$—<br>\|<br>$CH_3$ | —$C_2H_5$ | H | H | 250 |
| —$CH_2$—$CH_2$— | —$C_2H_5$ | H | —Cl | 218 |
| —$CH_2$—$CH_2$— | —$CH_3$ | H | H | 210 |
| —$CH_2$—$CH_2$— | —$CH_2$—CH—$CH_3$<br>\|<br>$CH_3$ | H | H | 228 |
| —$CH_2$—$CH_2$— | —$C_4H_9$ | H | H | 205 |
| —$CH_2$—$CH_2$— | n—$C_3H_7$ | H | H | 216 |
| —$CH_2$—$CH_2$— | —CH—$CH_3$<br>\|<br>$CH_3$ | H | H | 220 |

The compounds of the present invention possess a strong atropinic effect but possess marked advantages over atropine. In particular they have little or no effect on salivation or intestinal secretion such as is produced by atropine, and thus on administration produce little or no drying of the mouth, or diarrhea or vomiting. In addition the new compounds further possess some antihistaminic activity but on the other hand prolong the hypotensive effect of histamine. They possess a spasmolytic effect similar to that of papavarine and have some anti-emetic action. The new compounds also show marked anaesthetic properties, the infiltration anaesthetic effect of the compound N,N'-di-(β-phenylethyl-acetyloxyethyl)-piperazine dihydrochloride being greater than that of xylocaine although its contact effect is slightly less than that of cocaine. At the same time they have been shown to have a low toxicity and to be capable of absorption from the gastro-intestinal tract.

The new compounds of Formula I may be prepared by reacting compounds of formula

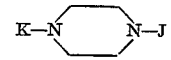

with compounds of formula

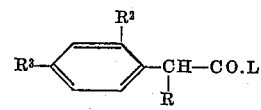

where R, $R^2$ and $R^3$ have the meanings stated above and J and K which may be the same or different are groups capable of reacting with the group L to form the groups —Alk— and $Alk^1$— which have the meanings stated in claim 1.

Thus J and K may be groups of the formula HO—Alk and/or HO—$Alk^1$ where Alk and $Alk^1$ have the meaning stated above, and L may then represent a halogen atom, such as chlorine. The reaction is preferably carried out in an anhydrous inert solvent, such as anhydrous benzene in the presence of an acid binding agent such as an alkali metal carbonate or bicarbonate, e.g. sodium and potassium carbonates and bicarbonates.

Alternatively, J and K may represent hydrogen atoms, or the system —$H.H_2O$, and L may then represent a group of the formula —Alk—Hal where Hal represents a halogen atom such as chlorine. This reaction may be carried out in the presence or absence of solvents. Solvents which may be used for the reaction include for example benzene or dioxan.

Again the groups J and K may represent the group —(Alk)—Hal, where Hal represents a halogen atom such as chlorine and in this case L may be the group OM where M represents a hydrogen atom or an alkali metal such as sodium or potassium. The reaction is preferably carried out in the presence of an inert solvent for example anhydrous benzene and in the presence of an acid binding agent, for example, anhydrous potassium carbonate.

It will be apparent that variations and extensions of the methods outlined above are possible, enabling further variations in the substituents to be obtained. Thus, if two different compounds of Formula III are reacted with a compound of Formula II a mixture of compounds of Formula I will result in which R, $R^2$ and $R^3$ are not necessarily the same as $R^1$, $R^4$ and $R^5$ respectively.

Further, compounds of Formula I may be prepared in which R and/or $R^1$ are hydrogen atoms and, since such hydrogen atoms will be activated by the adjacent phenyl and ester groups, the compounds may be reacted subsequently with appropriate halides, such as alkyl halides, to produce other compounds of Formula I in which R and $R^1$ are other than hydrogen and may be different if desired. Such a reaction may be carried out in an alkaline medium such as alcoholic sodium ethoxide.

In order that the invention may be fully understood the following examples are given by way of illustration only:

Example 1

8.7 gm. (1/20 mole) of N,N'-di-(β-hydroxyethyl)-piperazine are placed in a flask with 150 ccs. of anhydrous benzene and 16.8 gm. of sodium bicarbonate and 17.5 gm. phenylethylacetyl chloride run in dropwise with stirring. After heating for four hours with continued stirring and then leaving overnight the precipitate of sodium chloride is filtered off, and the solution dried over anhydrous sodium sulphate. The sodium sulphate is then removed and dry hydrochloric acid gas passed through the dried benzene solution until the dihydrochloride has precipitated. The product, N,N'-di-(β-phenylethyl-acetyloxyethyl)-piperazine dihydrochloride, may be recrystallised, after isolation by filtration, from alcohol/ether or acetone.

Example 2

45.3 gm. (2 mols.) phenylethylacetyl-β-hydroxyethyl chloride are heated with 8.6 gm. piperazine at 120° C. for several hours. The resulting product is dissolved in hot ethanol and caused to crystallise by cooling and adding ether or acetone.

Example 3

10.1 g. (1/20 mole) of N,N'-β-hydroxypropyl-piperazine were dissolved in 100 dioxan in a vessel provided with a stirrer and cooling means and 8.4 g. sodium bicarbonate added. 18.25 g. phenylethylacetyl chloride were then added drop by drop with stirring, heated for a further 6 hours under reflux with stirring and allowed to stand overnight. The next day, 10 mls. concentrated HCl dissolved in 10 mls. water were added, the temperature brought to 15° C., the NaCl precipitate filtered off and the product extracted with ether. After concentration and crystallisation followed by recrystallisation from alcohol/ether there was obtained N,N'-di-(β-phenylethyl-acetyloxypropyl)-piperazine dihydrochloride, M.P. >250° C.

Example 4

7.2 g. (1/24 mole) N,N'-di-(β-hydroxyethyl)-piperazine were dissolved in 100 mls. anhydrous benzene in a flask provided with stirrer, cooling means and a dropping funnel. After adding 7 g. sodium bicarbonate, 18 g. of p-chlorophenylethylacetyl chloride were added dropwise, and the mixture heated for a further 4 hours under reflux with good stirring and left overnight. The next day the sodium chloride was filtered off, dissolved in water, extracted with benzene and this benzene extract dried over sodium sulphate together with the benzene filtrate. After evaporation to dryness under vacuum the base was redissolved in 100 mls. alcohol and 20 mls. ether and a strong stream of HCl (dried over $H_2SO_4$) passed through until the pH fell to 3. The temperature rose and then a precipitate formed. After cooling in the refrigerator filtering and recrystallising the precipitate from water three times, one obtained N,N'-di-(β-p-chlorophenylethylacetyloxyethyl)piperazine dihydrochloride, M.P. 218° C.

Example 5

14 g. phenylethylacetic acid, 12 g. N,N'-di-(β-chloroethyl)-piperazine dihydrochloride, 14.5 g. anhydrous potassium carbonate and 30 mls. anhydrous benzene were heated for 18 hours with stirring in a flask provided with a stirrer and cooling means. 50 mls. water at 40° C. were then added with stirring to dissolve the precipitated potassium chloride and the base extracted with benzene. On acidifying N,N'-di-(β-phenylethylacetyloxyethyl)-piperazine dihydrochloride was obtained; M.P. 223° C.

Example 6

8.7 g. (0.05 mol) of N,N'-di-(β-hydroxyethyl)-piperazine were mixed with 18.2 g. phenylethylacetyl chloride in a cooled flask. 30 ccs. of anhydrous ether were added. The mixture was heated under reflux for half an hour and then left to stand at room temperature for 24 hours. The dihydrochloride was thus formed directly. Before filtering off the solid obtained it was verified that all smell of acid chloride had disappeared. The solid obtained was dissolved in 95% ethanol and allowed to crystallise. In general three recrystallisations from ethanol were necessary to obtain a completely white product. The crystals were washed with ether. M.P. 220° C.

I claim:

1. As new compounds, compounds of the formula

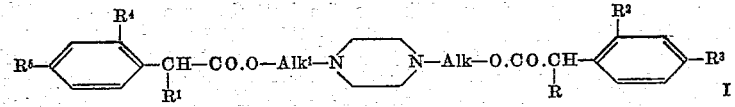

in which R and $R^1$ are members selected from the group consisting of a hydrogen atom, an alkyl group containing 1 to 5 carbon atoms, an allyl group and a vinyl group, Alk and $Alk^1$ are members selected from the group consisting of a straight chain alkylene group containing 1 to 3 carbon atoms and a branched chain alkylene group containing 1 to 3 carbon atoms; and $R^2$, $R^3$, $R^4$ and $R^5$ are members selected from the group consisting of a hydrogen atom, a chlorine atom and an alkoxy group containing 1 to 3 carbon atoms; and their non-toxic acid addition salts.

2. The compound having the formula

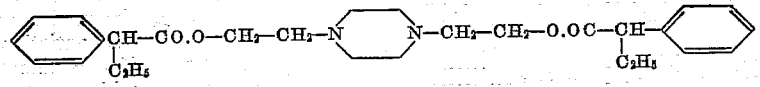

3. A non-toxic acid addition salt of the compound of claim 2.

4. The compound having the formula

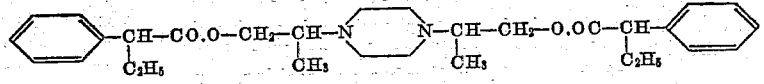

5. A non-toxic acid addition salt of the compound of claim 4.

6. The compound having the formula

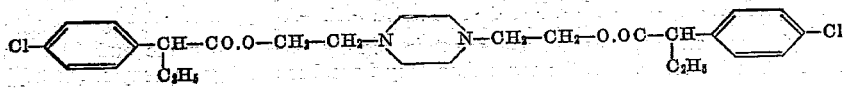

7. The compound having the formula
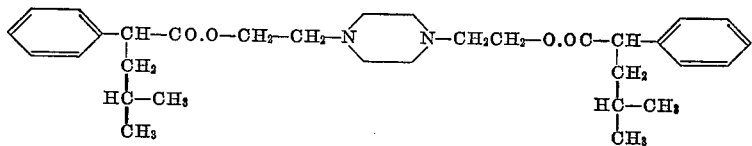
8. The compound having the formula
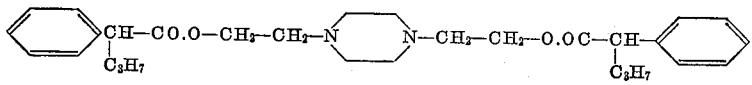
References Cited in the file of this patent
Pyman: Jour. Chem. Society (London), pp. 1802–1803 (1908).
Zaugg et al.: Jour. Amer. Chem. Soc., vol. 72, pp. 3004–3007 (1950).